Figure 1:
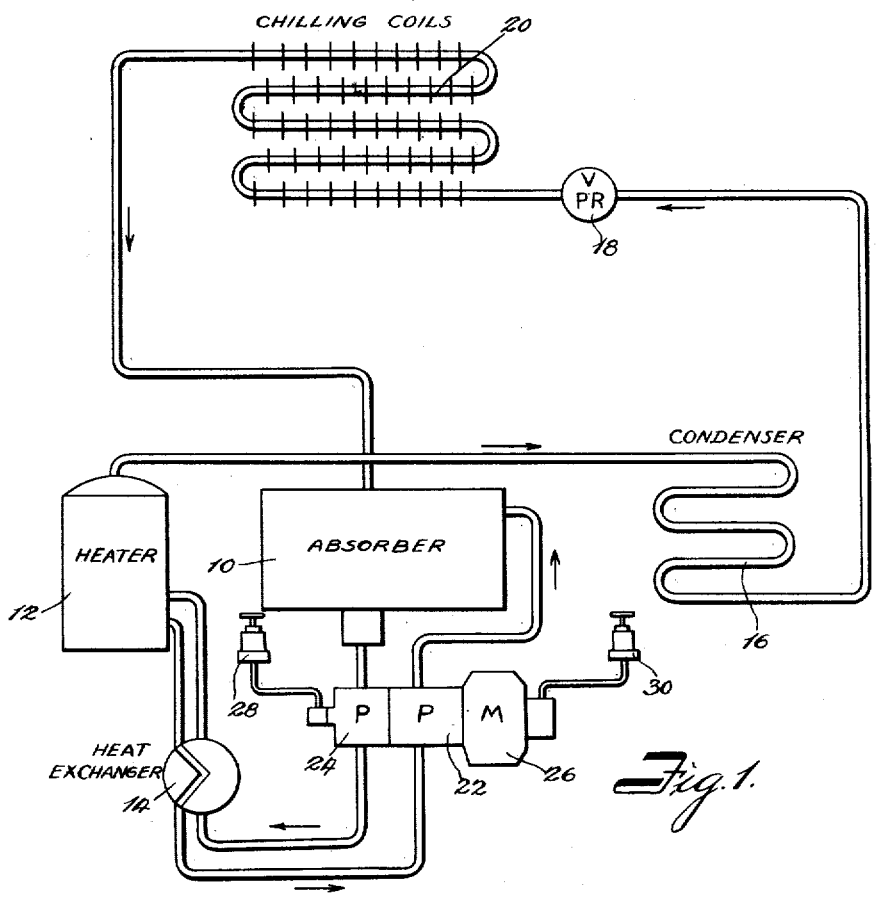

Feb. 5, 1946.  H. B. LAWTON  2,394,081

LUBRICATOR FOR REFRIGERATING SYSTEMS

Filed May 8, 1942

Inventor.
Harvey B. Lawton
By Thiess, Olson & Mecklenburger
Attys

Patented Feb. 5, 1946

2,394,081

UNITED STATES PATENT OFFICE 2,394,081

LUBRICATOR FOR REFRIGERATING SYSTEMS

Harvey B. Lawton, Bloomington, Ill., assignor, by mesne assignments, to Eureka Vacuum Cleaner Company, Detroit, Mich., a corporation of Michigan Application May 8, 1942, Serial No. 442,139

2 Claims. (Cl. 184—38)

This invention relates to a lubricator and more particularly to a lubricator which is useful for supplying lubricant to the moving parts of a hermetically sealed refrigerating system.

Hermetically sealed refrigerating systems are now on the market in which the motors, pumps and other fluid driving means having movable parts are sealed within the system and are normally not accessible from the outside. The lubrication of these moving parts within hermetically sealed systems of this character has been effected by bearings which have been packed with lubricant which is intended to last for the life of the system or until such time as the hermetic seal is to be broken. The usual types of lubricator for injecting grease or oil into the system adjacent the moving parts as needed are not satisfactory for the reason that they cannot be used with a hermetically sealed system which may be subjected to subatmospheric or superatmospheric internal pressures. In refrigerating systems, particularly in refrigerating systems of the absorption type, the working fluid may, under certain conditions, have a tendency to react with or to dissolve to a very small degree the lubricant that is packed within the hermetically sealed pump and motor bearings. Thus, after long periods of use, the pumps and motors in a hermetically sealed refrigerating system may have a tendency to knock, due to loss of lubricant adjacent the moving parts thereof. Accordingly, an object of this invention is to provide a lubricator for supplying lubricant to the moving parts of a hermetically sealed refrigerating system.

A further object of this invention is the provision of a lubricator capable of supplying lubricant to the moving parts of a hermetically sealed refrigerating system which is substantially unaffected by increased or reduced pressure within the system.

An additional object of this invention is the provision of a lubricator for a hermetically sealed refrigerating system which is operable to inject a desired quantity of lubricant to the moving parts of the system as desired during the life of the system itself.

A still further object of this invention is the provision of a hermetically sealed refrigerating system in which the moving parts may be properly and periodically lubricated as desired.

Further and additional objects will be apparent from the following description, the accompanying drawing, and the appended claims.

In accordance with one preferred embodiment of this invention, the lubricator comprises a sealed collapsible lubricant container, a conduit communicating the collapsible container with the moving parts that are to be lubricated, a manually operated pressure member for collapsing the container to any desired degree, thus forcing lubricant through the conduit to the moving parts, and means cooperating between the collapsible container and the pressure member for preventing the atmospheric pressure collapse of the container in the event that reduced pressure obtains within the hermetically sealed refrigerating system. The collapsible container may comprise a metal bellows positioned within and secured to a suitable housing. The bellows may be collapsed by a rotatable pressure member such as a thumb screw threadably engaged with one wall of the housing, and the thumb screw and bellows are preferably associated with each other in such a manner that they are not separable, thus preventing the collapse of the bellows due to atmospheric pressure in case pressure below atmospheric obtains within the refrigerating system.

Figure 2:
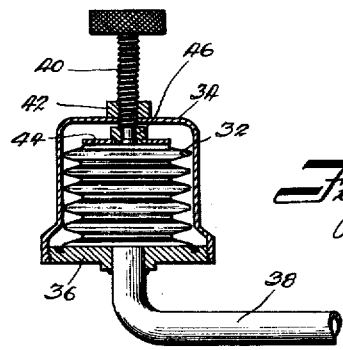

For a more complete understanding of this invention, reference will now be had to the drawing, in which Fig. 1 is a diagrammatic representation of a hermetically sealed refrigerating system having a pair of lubricators constructed in accordance with this invention associated therewith; and Fig. 2 is a sectional detail view of one of the lubricators indicated generally in Fig. 1.

Referring now to Fig. 1, an absorption type refrigerating system is there shown having a pair of lubricators constructed in accordance with one embodiment of this invention associated therewith. The refrigerating system comprises an absorber 10 in which a refrigerant vapor, such as methylene chloride, is absorbed by a solvent, such as the dimethyl ether of tetraethylene glycol; a heater 12 in which the refrigerant is distilled from the solvent solution; a heat exchanger 14 for effecting the transfer of heat from the hot weak solvent solution flowing from the heater to the absorber to the cool strong solution of refrigerant dissolved in the solvent flowing from the absorber to the heater; a condenser 16 in which the refrigerant vapor from the heater is condensed to a liquid; a pressure relief valve 18 through which the refrigerant is expanded; chilling coils 20 through which the cooled expanded refrigerant vapor is passed; and mechanism for circulating working fluid between the absorber 10 and the heater 12 including pumps 22 and 24 and a motor 26. The system thus far briefly described is one such as is well known in the art and is of the general type more completely described in the copending application of Walter W. Williams, Serial No. 350,993, filed August 3, 1940.

The refrigerating system described briefly in the foregoing may be hermetically sealed and in such case the bearings and other moving parts of the pumps and motor are also sealed and therefore they cannot normally be lubricated from an outside source while the apparatus is in use. Inasmuch as it has been found to be desirable under certain conditions of use to supply lubricant to certain of the bearings or other moving parts of a refrigerating system of this character during use, a lubricator containing a suitable lubricant has been devised in accordance with this invention which will permit periodic injection of a lubricant to the moving parts of the system as desired. As shown in Fig. 1 for example, a lubricator 28 may be employed for lubricating a hermetically sealed pump bearing and a similar lubricator 30 may be employed for lubricating a hermetically sealed motor bearing.

Referring now more particularly to Fig. 2, the lubricator constructed in accordance with one embodiment of this invention comprises a collapsible metal bellows 32 having an open end and a closed end positioned within a housing 34. The housing 34 has an end wall 36 through which extends a lubricant conduit 38. The bellows 32 is sealed adjacent its open end by welding or soldering to the plate 36 in such a manner that the conduit 38 communicates with the sealed space defined by the bellows and the end wall. A rotatable member or thumb screw 40 extends through the housing 34 and is threadably engaged with a bushing 42 secured to the housing. The end of the thumb screw within the housing abuts against the closed end of the bellows 32 so that when the screw is turned down, the bellows 32 is caused to collapse, thus forcing lubricant through the conduit 38 to the moving parts to be lubricated. In order to prevent the bellows 32 from collapsing in case reduced pressure obtains within the refrigerating system, an apertured plate 44 and apertured bushing 46 are welded, brazed, or otherwise secured to the closed end of the bellows 32. The end of the thumb screw 40 abutting the closed end of the bellows extends through and is rotatable in the apertures of the plate 44 and the bushing 46, and said end is flared outwardly to cooperate with said apertures to prevent the separation of the end of the bellows and the end of the thumb screw.

It will be apparent from the above description that grease or other lubricant may be ejected from the lubricator through the conduit 38 by turning down the thumb screw 40 as desired. In the event that superatmospheric pressure should obtain within the refrigerating system, the bellows will not become inflated for the reason that it is prevented from doing so by the end of the thumb screw 40. Consequently there is no tendency for the lubricant to be pushed back up into the conduit 38 away from the moving parts of the system. On the other hand, if the pressure in the system should drop to below atmospheric, the atmospheric pressure collapse of the bellows 32 will be prevented by the outwardly flared end of the thumb screw 40 cooperating with the apertures in the bushing 46 and the plate 44 which are secured to the closed end of the bellows 32. Thus, means are provided for preventing discharge of lubricant to the moving parts except when the thumb screw 40 is turned down.

Grease or other lubricant is preferably supplied to the bellows 32 through the conduit 38 prior to the time that the lubricator is connected with the refrigerating system and preferably the lubricator or lubricators are connected to the system prior to the time that the system is hermetically sealed. In operation, when the moving parts of the pump or motor lubricated by the lubricator of this invention have a tendency to become noisy after long periods of use, they may be lubricated by turning down the thumb screw 40, thereby injecting a predetermined amount of lubricant to the desired point. The amount of lubricant contained within the lubricator is ordinarily sufficient periodically to lubricate the system throughout its normal life or until such time as the hermetic seal is broken, at which time the lubricator may be disconnected and refilled with lubricant.

In the foregoing, the lubricator of this invention has been described with particular reference to a refrigerating system of the absorption type. However, it will be clear that under certain conditions it could also be used for the moving parts of a refrigerator of the compression type. Also it may be advantageously used in any system where pressures other than atmospheric may obtain.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:

1. In a hermetically sealed refrigerating system having working parts requiring lubrication positioned therewithin and wherein pressures other than atmospheric may obtain, the combination of a lubricator for said working parts which comprises a pressure-tight collapsible lubricant container, a conduit communicating said container with said system at a point adjacent said working parts, pressure exerting means for collapsing said container as desired to force lubricant through said conduit to said system, and means associated with said last mentioned means for preventing atmospheric pressure collapse of said container in the event that reduced pressure should obtain within said system.

2. In a hermetically sealed refrigerating system having working parts requiring lubrication positioned therewithin and wherein pressures other than atmospheric may obtain, the combination of a lubricator for said working parts which comprises a pressure-tight collapsible lubricant container, a conduit communicating said container with said system at a point adjacent said working parts, and pressure exerting means for positively controlling the degree of collapse of said container whereby the latter is substantially unaffected by the pressure within said system.

HARVEY B. LAWTON.